Oct. 21, 1930. L. H. BAILEY Re. 17,842
COMPRESSING MACHINE
Original Filed June 16, 1928
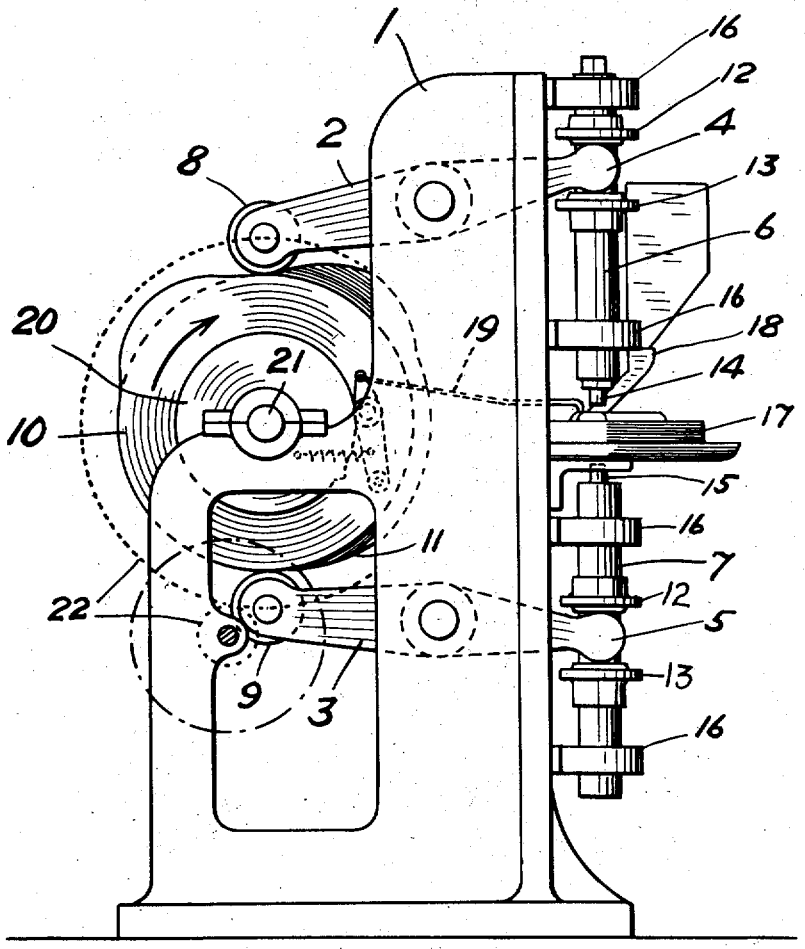
WITNESS:
Robt. R. Mitchel.
INVENTOR
Lawrence H. Bailey
BY
Augustus B. Stoughton
ATTORNEY.

Reissued Oct. 21, 1930

Re. 17,842

UNITED STATES PATENT OFFICE

LAWRENCE H. BAILEY, OF PHILADELPHIA, PENNSYLVANIA, ASSIGNOR TO F. J. STOKES MACHINE COMPANY, OF PHILADELPHIA, PENNSYLVANIA, A CORPORATION OF PENNSYLVANIA

COMPRESSING MACHINE

Original No. 1,768,500, dated June 24, 1930, Serial No. 286,007, filed June 16, 1928. Application for reissue filed August 6, 1930. Serial No. 473,418.

The present invention relates to a new type of automatic compressing machine for compressing dry, pulverous or granular material into tablets, pills or briquettes. The novelty of the press consists in simultaneously moving and forcing the upper and lower punches together in a die thereby squeezing the material from both ends by the moving action of both dies. Heretofore in a reciprocating die punch machine of this type the lower punch during compression was seated on the base of the machine and the entire compression was the result of the movements of the upper punch which was driven down into the die by suitable means while the lower punch was at rest, and after compression the upper punch was raised followed by the lower punch which ejected the tablets from the top of the die.

There are certain articles which must have a uniform density as far as possible. Where the compression takes place from one end only as by means of a single moving punch, the density is greater at the end of the article which engages with the moving punch. This is due to side wall friction of the material in the die. By compressing from both ends and between two moving punches in accordance with the present invention the density is made the same on both ends of the tablet or briquette. For certain classes of work it is convenient to eject the compressed article through the bottom of the die rather than through the top, and this is possible with the type of machine embodying features of the invention.

Generally stated, the invention comprises a compressing machine having a frame provided with stationary bearings, a stationary die mounted on the frame, top and bottom punches mounted in said stationary bearings, and means for simultaneously moving and forcing both the top and bottom punches towards each other in the die.

The invention also comprises the improvements to be presently described and finally claimed.

In the following description reference will be made to the accompanying drawing forming part hereof and in which the single figure is a side view of a machine embodying features of the invention.

In the drawing 1 is a frame or housing in which are pivotally mounted two arms 2 and 3 provided with forks 4 and 5 through which the upper plunger 6 and the lower plunger 7 pass. At their other ends these arms 2 and 3 are equipped with hardened steel rollers 8 and 9 which cooperate with cams 10 and 11. 12 and 13 are regulating collars for adjusting the stroke of the plunger. In the bottom of the plunger 6 the top die or punch 14 is fastened and in the top of the plunger 7 the bottom die or punch 15 is fastened. The plungers 6 and 7 are afforded endwise movement in stationary bearings 16 forming part of the frame 1 or operatively fixed in respect to the frame 1. 17 is a die table upon which is mounted a die open at each end and clear through it. 18 is a feeder actuated through the connections 19 by a cam 20 and adapted by a swinging movement to deliver material to the die and to clear the same for the actuation of the plunger.

The cams 10 and 11 are provided with high parts and they serve to simultaneously move and force both the top and the bottom punches towards each other in the die. The cams are also provided with cam surfaces that serve to lower the lower punch followed by the upper punch which ejects the pressed article. The shaft 21 carries the cams and is driven by gearing indicated at 22.

The mode of operation may be described as follows:

An appropriate supply of material to be compressed is introduced into the die by the feeder 18, and then the cams operate to simultaneously, and also equally, if desired, move and force both the top and bottom punches 14 and 15 towards each other in the die, thus squeezing the material from both ends and imparting to the finished product substantially the same density throughout. Then the finished product is ejected from the die.

It will be obvious to those skilled in the art to which the invention relates that modifications may be made in details of construction and arrangement and in matters of mere form without departing from the spirit of the invention which is not limited to such matters or otherwise than as the prior art and the appended claims may require.

I claim:

1. A compressing machine having a frame provided with stationary bearings, a stationary die mounted on the frame, top and bottom plungers carrying punches and mounted in said stationary bearings, arms pivoted to the frame and having ends adjacent said plungers, regulating collars adjustably mounted on said plungers to cooperate with said ends of said arms, and separate cams for each of the arms mounted on one axis on the frame and adapted to operate on the arms to simultaneously move and force both the top punch and the bottom punch towards each other in the die.

2. A compressing machine according to claim 1 wherein the cams are arranged to withdraw said bottom punch and to insert said top punch to expel the product of the machine from the die through the bottom thereof.

LAWRENCE H. BAILEY.